United States Patent [19]

Sokolow

[11] 4,076,485
[45] Feb. 28, 1978

[54] SHUT-OFF VALVE FOR PLASTIC MELT INJECTION

[75] Inventor: Nickolas N. Sokolow, Cheshire, Mass.

[73] Assignee: Beloit Corporation, Beloit, Wis.

[21] Appl. No.: 699,347

[22] Filed: Jun. 23, 1976

[51] Int. Cl.² .............................................. B29F 1/04
[52] U.S. Cl. .................................... 425/562; 425/563
[58] Field of Search ......... 425/245 R, 247, DIG. 224, 425/DIG. 229, 562, 563, 564, 567; 239/569; 251/318

[56] References Cited

U.S. PATENT DOCUMENTS

| 3,037,245 | 6/1962 | Darnell | 425/245 X |
| 3,741,704 | 6/1973 | Beasley | 425/245 |
| 3,849,048 | 11/1974 | Bielfeldt | 425/247 |

Primary Examiner—Richard B. Lazarus
Attorney, Agent, or Firm—Larson, Taylor and Hinds

[57] ABSTRACT

An improvement is provided for plastic molding machinery of the type comprising a plastic melt injection apparatus and a mold. A shut-off valve which provides communication between the injection apparatus and the mold, includes a single elongate passageway and an elongate shut-off piston oriented generally parallel to the flow path and mounted in the passageway by a housing, which housing is supported by a single, streamlined leg so that the plastic melt flows therethrough in a single, undivided flow path. The melt flow path, as defined by the passageway and housing mounted therein has a generally circular transverse cross-section at an upstream station and a generally U-shaped transverse cross-section at a station downstream of the circular station. An aspect of the improvement is a plug-shaped tip formed integrally on the downstream end of the piston for expelling residue and cleaning the outlet port especially in structural foam molding applications. A further aspect of the improvement is an elongate nozzle for molding applications with larger molder sizes that require an extra long injection reach.

14 Claims, 12 Drawing Figures

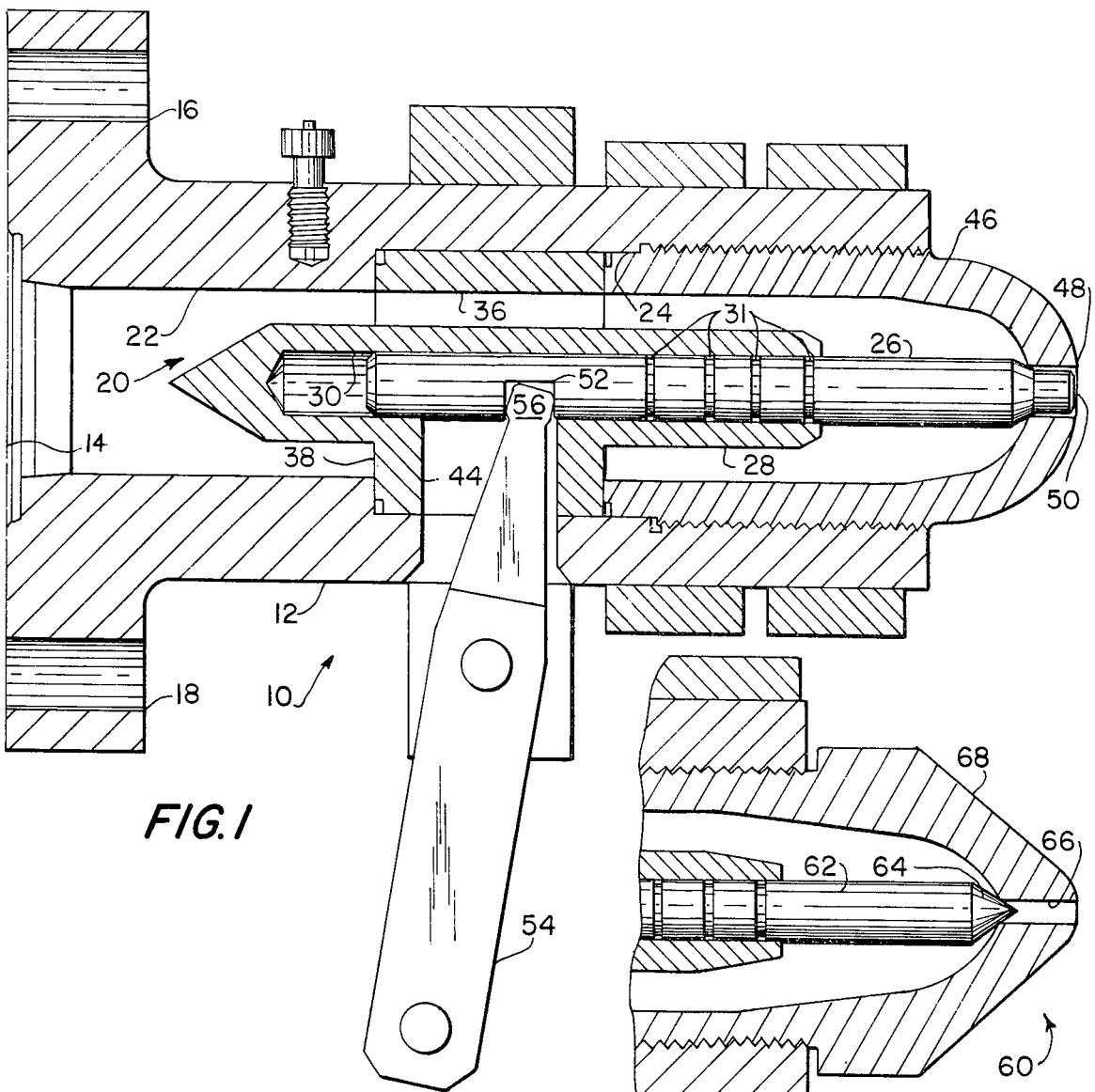
FIG. 1
FIG. 7
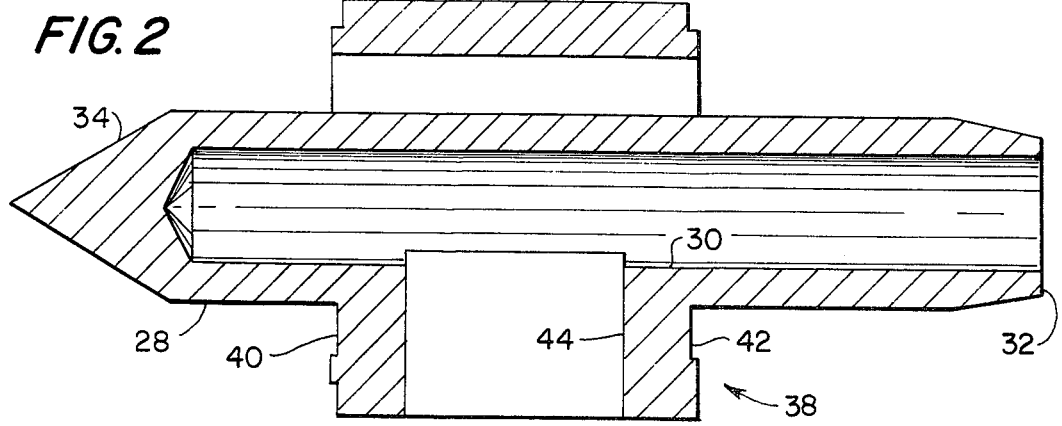
FIG. 2

SHUT-OFF VALVE FOR PLASTIC MELT INJECTION

BACKGROUND OF THE INVENTION

1. Field of the Invention

This invention relates to plastic molding machinery and more particularly to an improved shut-off valve for a conventional injection molder and/or a structural foam injection molder, the valve providing communication between a plastic melt injection apparatus and a mold.

2. Description of the Prior Art

Originally only an open nozzle was used to provide communication between a plastic melt injection apparatus and a mold. However, the precise timing and quantity of plastic melt injected into the mold cannot be controlled with an open nozzle. Thus, valves were developed to control the timing and the plastic "shot size."

Prior art valves generally comprise a valve body with an internal, elongate passageway that defines a path for the flow of plastic melt. The passageway has a charging port at one end and a discharging port at the opposite end, and has a piston located therein for metering plastic through the discharge port. The piston is generally elongated and cylindrical, and is slidably mounted in a cylindrical housing that is disposed in the passageway so as to be parallel thereto. The housing is supported by a plurality of spider legs that extend radially from the housing and are rigidly attached to the walls of the valve body forming the outer boundary of the passageway. Generally, the legs are as thin as practicable so as not to unnecessarily restrict plastic melt flow, while being sufficiently sturdy to withstand the pressures developed in the valve.

However, this arrangement of spider legs nonetheless has several inherent and substantial disadvantages. Firstly, the legs divide the plastic melt flow into a plurality of individual flow paths. Thus for illustrative purposes only, if a mass of plastic melt progressed through a valve having four spider legs to secure the piston housing in place, the melt would be forced around these legs, thus dividing the plastic mass into four flow paths. Although the individual flow paths eventually merge into one flow path before the plastic melt is injected into the mold, the plastic, having "memory", retains to some extent these divisions which show up as weakened seams in the final molded product.

Secondly, as the plastic moves at a high velocity over the spider legs, frictional energy is generated which scorches or burns the plastic and the additives or chemical modifiers that has stagnated adjacent the legs. This burning causes melt degradation and poor rejoining of the sub-streams, resulting in yellowish or brownish streaks in the final product.

Thirdly, plastic tends to hand-up on the upstream portion of the spider legs, the valve requiring disassembly and cleaning on a regular basis so that the passageway does not become clogged. Additionally, this hung-up plastic, if it becomes dislodged and flows into the mold, produces irregularities in the final product.

Fourthly, the legs do restrict the flow of plastic melt, creating greater compressive forces that affect the structure of the foam cells. Also occurring immediately following the spider legs, are pockets of drastic expansion that also affect the foam cells by creating premature foaming.

A fifth disadvantage relates to the actual construction of the plurality of spider legs. The legs must be machined by an electro-discharged machining process and are thus relatively expensive.

SUMMARY OF THE INVENTION

An improvement is provided for plastic molding machinery of the type comprising a plastic melt injection apparatus and a mold. The improvement comprises a shut-off valve that provides communication between the injection apparatus and the mold. The valve allows the plastic melt to flow therethrough in a single, undivided flow path. The valve includes a single, elongated passageway and an elongate plastic shut-off rod, also referred to hereinafter as a piston, oriented generally parallel to the flow path and mounted in the passageway by a housing. The housing is supported in the passageway by a single, streamlined leg. The melt flow path, as defined by the passageway and housing mounted therein, has a generally circular, transverse cross-section at an upstream station and a continuous generally U-shaped transverse cross-section at a station downstream of the circular station.

An aspect of the improvement is a plug-shaped tip formed integrally on the downstream end of the piston for expelling residue and cleaning the outlet port especially in structural foam molding applications. A further aspect of improvement is an elongate nozzle for molding applications with larger molder sizes that require an extra long injection reach.

This valve overcomes the disadvantages inherent in the prior art. Firstly, since the valve of the invention allows the plastic melt to flow through a single, undivided flow path, there are no divisions in the plastic for the "memory" of the plastic to retain. Thus, there are no visual and structural divisions, such as weakened seams, in the final molded product.

Secondly, even though the plastic moves at a high velocity around the single streamlined leg, the frictional energy generated does not degrade, scorch or burn the plastic, as areas of stagnation adjacent the leg have been eliminated. Thus, there are no yellowish or brownish streaks in the final product.

Thirdly, plastic does not hang-up on the upstream portion of the housing or leg, so the passageway remains unclogged and there is no buildup of plastic that can later become dislodged and flow into the mold, producing irregularities in the final product.

Fourthly, areas of increased compressive forces and areas of drastic expansion that affect the plastic structure, and especially the foam cell structure, are eliminated. Thus, premature foaming is eliminated.

Fifthly, the valve is easily constructed using conventional and inexpensive machinery techniques.

Hence, it is an object of this invention to provide a shut-off valve between the plastic melt injection apparatus and a mold that allows the plastic melt to flow therethrough in a single, undivided flow path.

It is a further object of this invention to provide a shut-off valve that has a single passageway and a shut-off piston, wherein the piston is mounted in a housing, and the housing is mounted in the passageway by a single, streamlined leg so as not to obstruct or divide the flow or plastic melt through the valve.

Another object of this invention is to provide a melt flow path as defined by the passageway and housing that has a generally circuit transverse cross-section at an upstream station and a generally U-shaped transverse cross-section at a station downstream of the circular station.

A further object of this invention is to provide a valve piston with a plug-shaped tip for expelling residue and cleaning the outlet port, especially in structural foam molding applications.

Another object of this invention is to provide an elongate nozzle for molding applications with larger molder sizes that require an extra long injection reach.

Additional features and advantages of the invention will be set forth in, or apparent from, the detailed description of the preferred embodiment of the invention found hereinbelow.

BRIEF DESCRIPTION OF THE DRAWINGS

FIG. 1 is a central longitudinal cross-sectional view of a shut-off valve constructed according to the present invention, this particular construction being adapted especially for plastic foam molding machinery;

FIG. 2 is an enlarged central longitudinal cross-sectional view of a piston housing for a piston located in the passageway of the valve depicted in FIG. 1;

FIG. 7 is a partial cross-sectional view similar to a portion of FIG. 1 but showing a modification of the shut-off valve, this particular construction being adapted for use with conventional (non-foam) injection molding machinery;

DETAILED DESCRIPTION OF THE PREFERRED EMBODIMENTS

Figure 8:
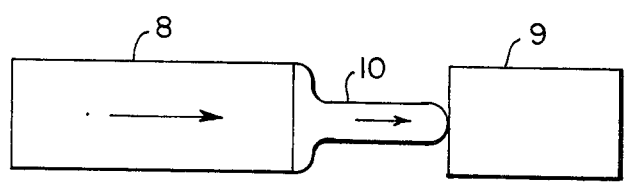
FIG. 8 is a diagrammatic representation of a molding apparatus employing the shut-off valve of the present invention.

An improvement is provided for plastic molding machinery of the type comprising a plastic melt injection apparatus and a mold. Referring to FIG. 8, the improvement comprises a shut-off valve 10 for providing communication between a plastic melt injection apparatus 8 and a mold 9. The valve 10 allows the plastic melt to flow therethrough in a single, undivided flow path.

Referring to the figures, and in particular to FIG. 1, a shut-off valve 10 for foam injection machinery is depicted. Valve 10 includes an elongate valve body 12 with a melt inlet port 14. Valve 10 is secured to a plastic foam melt injection apparatus (not shown) with bolts (not shown) located through a plurality of apertures, two of which are apertures 16 and 18, so that inlet port 14 communicates with an outlet port of the melt injection apparatus. A passageway 20 extends from inlet port 14 through valve body 12. Passageway 20 includes a first cylindrical portion 22 and a second cylindrical portion 24 located distally from the inlet port 14 that is coaxial with, but has a larger cross-sectional diameter than, first cylindrical portion 22. Additionally, the most distal portion of second cylindrical portion 24 has threads machined into the surface thereof.

Figure 3:
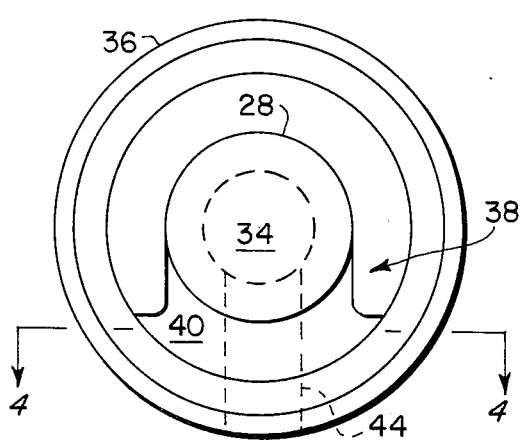
FIG. 3 is an end view of the piston housing taken along line 3—3 in FIG. 2.

Valve 10 further includes a shut-off piston 26 slidably mounted in a bore 30 in elongate, cylindrical housing 28. Referring to FIGS. 2 and 3, an enlarged central, longitudinal cross-section of housing 28 is depicted. Bore 30 extends through the downstream end 32 (FIG. 2) of housing 28, up to, but not through, the upstream end 34 of housing 28. The upstream end 34 of housing 28 is generally conical in shape so as to make housing 28 more streamlined. Integrally formed with housing 28 is a cylindrical sleeve 36 disposed concentrically thereabout, and a streamlined leg 38 that connects housing 28 to sleeve 36. The diameter of the internal cylindrical surface of sleeve 36 is the same as the diameter of the first cylindrical portion 22 of passageway 20.

Figure 4:
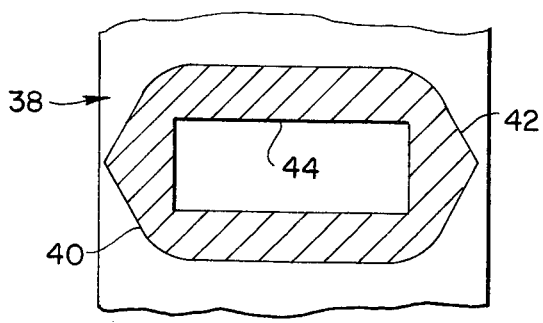
FIG. 4 is a cross-sectional view of the single housing-supporting leg taken along line 4—4 in FIG. 3.

Streamlined leg 38, as seen in FIGS. 2, 3 and 4, has a generally plow-shaped upstream-facing surface 40. That is to say surface 40 has an upstream leading edge with two divergent surfaces extending downstream and outwardly therefrom. Leg 38 has a similar plow-shaped, downstream-facing surface 42. The sides of leg 38 are generally parallel to the direction of flow of the plastic melt in passageway 20. Through the central portion of streamlined leg 38 and the adjacent portion of cylindrical sleeve 36 extends a second passageway 44, having a rectangular transverse cross-section, that communicates with bore 30 of housing 28, the purpose of which will be explained below.

Housing 28, sleeve 36 and leg 38, as well as the rest of valve 10 can be comprised of suitable materials, such as metals, that can withstand the various temperatures and pressures that occur during the plastic melt injection operation. The various parts of valve 10 can thus be, for example, cast from metals and machined to exact tolerances. Alternatively, in an exemplary embodiment, a material comprising HRS 4140, heat treated to be between 38RC and 42RC is used. Additionally, the melt receiving surfaces, and especially the outer surface of housing 28 and leg 38, and the inner cylindrical surface of sleeve 36 can be chrome-plated to decrease the resistance encountered by the plastic melt flowing thereover and to facilitate cleaning, especially when changing plastic color.

Referring again to FIG. 1, sleeve 36 is received by the second cylindrical portion 24 of passageway 20 so as to be seated adjacent the first cylindrical portion 22 of passageway 20.

Valve 10 further comprises a nozzle 46 that is generally C-shaped in cross-section and has external threads that are compatible with the internal threaded section of passageway 20. As depicted in FIG. 1, the threads of nozzle 46 are received by the threads of passageway 20 so that nozzle 46 abuts sleeve 36 and holds sleeve 36 in position in valve body 12.

Nozzle 46 has an internal cylindrical surface with a diameter identical in size to the diameter of first cylindrical portion 22 of passageway 20. Nozzle 46 further includes a melt outlet port 48.

Piston 26, as depicted in FIG. 1, is generally elongate and includes a cylindrical plug-shaped tip 50 at one end thereof that is received by melt outlet port 48 of nozzle 46. Piston 26 also includes a transverse groove 52, located approximately three-fourths of the length of piston 26 away from tip 50. The portion of the piston in bore 30 has a number of circular grooves 31 to prevent possible leakage between piston 26 and housing 28.

Valve 10 further includes a lever 54, pivotally pinned to an external flange of valve body 12. Lever 54 extends through an aperture in valve body 12 and second passageway 44 and includes a rounded tip 56 that is received by transverse groove 52 of piston 26.

Figure 5A:
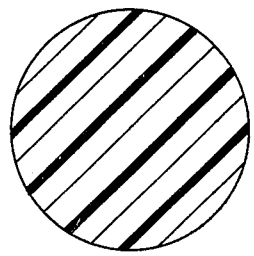
FIG. 5a depicts a transverse cross-section of a body of plastic melt as it flows through the valve upstream of the piston housing.
Figure 5B:
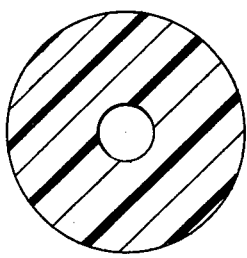
FIG. 5b depicts a transverse cross-section of the body of plastic melt as it flows onto the upstream end of the piston housing.
Figure 5C:
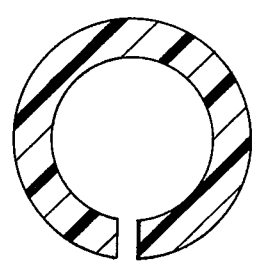
FIG. 5c depicts a transverse cross-section of the body of plastic melt as it flows adjacent the upstream edge of the leg supporting the piston housing.
Figure 5D:
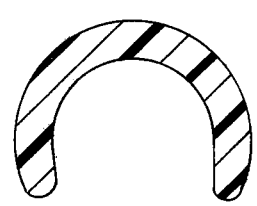
FIG. 5d depicts a transverse cross-section of the body of plastic melt as it flows midway along the leg.

The operation of shut-off valve 10 is as follows. Lever 54 is pivoted in a counterclockwise direction so as to withdraw plug tip 50 from melt outlet port 48. With valve 10 in an open position, plastic melt flows from a form injection apparatus through melt inlet port 14, through passageway 20, over and around piston housing 26 and streamlined leg 38, and out outlet port 48 to a mold. As depicted in FIGS. 5a to 5d, the plastic melt flow path through valve 10 progresses from having a generally circular transverse section (FIG. 5a) to having a generally U-shaped transverse section (FIG. 5d). Additionally, this flow can be characterized as laminar, low Reynolds Number flow.

When the mold is filled with plastic melt, lever 54 is pivoted clockwise so as to insert plug-shaped tip 50 into melt outlet port 48, stopping the flow of melt. Thus, the precise amount of plastic melt injected into the mold can be controlled by lever 54. Additionally, it should be noted that plug-shaped tip 50 of piston 26 eliminates foaming and drooling in the outlet port 48 of nozzle 46. Tip 50 also expels residue and cleans outlet port 48 for the next injection of plastic melt into the mold, which is important for structural foam molding applications.

Figure 6:
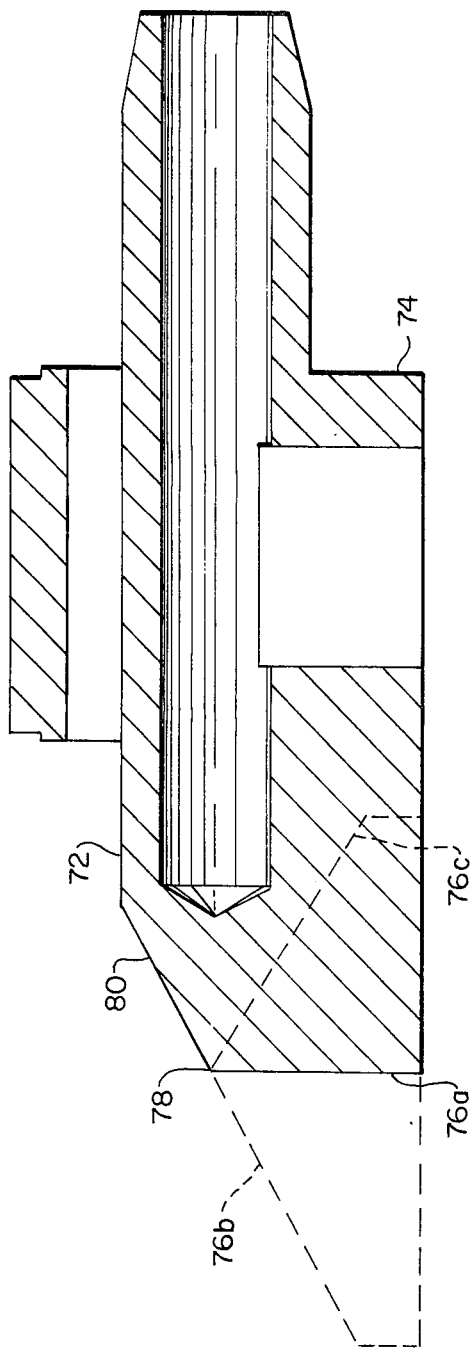
FIG. 6 is a central longitudinal cross-sectional view of the piston housing of another embodiment of the invention.

An alternate embodiment (FIG. 6) of the invention includes an integral piston housing 72 and leg 74 arrangement such that the upstream edge 76a of the leg 74 extends vertically downward from the apex 78 of the conical end 80 of housing 72, the rest of the leg remaining generally streamlined. Although not necessarily as economical to produce as the housing of the previous embodiment, this integral housing and leg arrangement presents a more streamlined leading surface to the oncoming plastic melt. Alternatively, for streamlining, the upstream edge 76b (shown dotted) of the leg can extend downwardly and in an upstream direction from the apex. Alternatively, the edge 76c (dotted) of the leg can extend downwardly and in a downstream direction from the apex. Again, in these arrangements, two divergent surfaces extend downstream and outwardly from the leading edge so that the remaining portion of the leg is generally streamlined.

A modification of the invention is shown in FIG. 7. FIG. 7 depicts only the downstream-most portion of a valve 60, suitable for use with conventional injection molding machinery. This embodiment includes a piston 62 that has a conical tip 64 that extends partially into melt outlet port 66 of nozzle 68 when seated in contact with port 66. In all other respects, the modified version of FIG. 7 is identical to, and operates in a manner similar to that described hereinabove.

Figure 9:
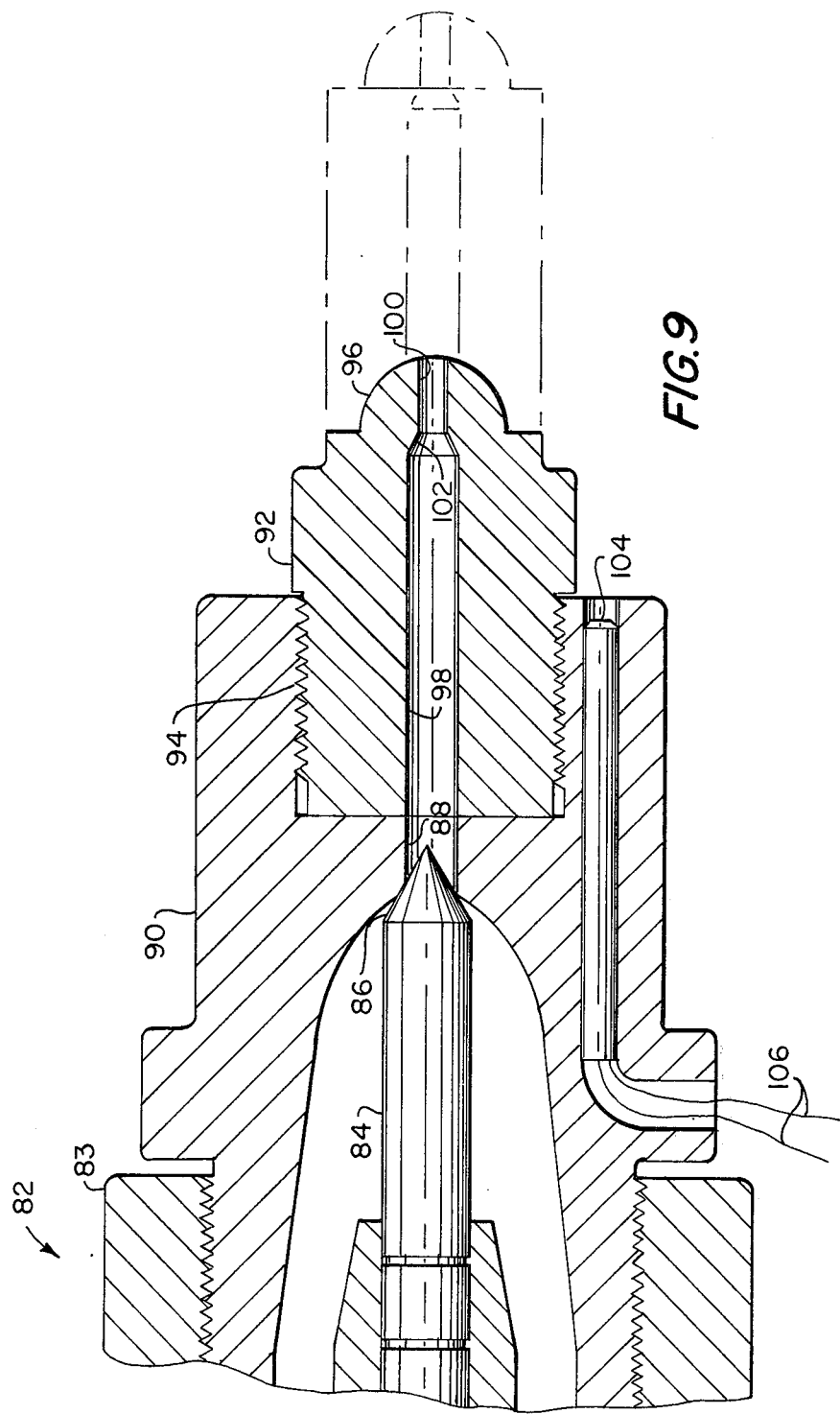
FIG. 9 is a partial cross-sectional view similar to a portion of FIG. 1 but showing a modification of the shut-off valve, this particular construction being adapted for use with larger molder sizes that require an extra long injection reach.

A further modification of the invention is shown in FIG. 9. FIG. 9 depicts only the downstream-most portion of a valve 82 with an elongate nozzle 92 suitable for use with injection molding machinery which require an extra long injection reach for larger molder sizes. This embodiment also includes a piston 84 that has a conical tip 86 that extends partially into melt outlet port 88 of nozzle adapter 90 when seated in contact with port 66. Adapter 90 has an external thread that is compatible with and threaded into an internally-threaded bore of valve body 83. Further, as depicted in FIG. 9, nozzle 92 is generally cylindrical and has an external threaded portion that is compatible with and threaded into internally threaded bore 94 of nozzle adapter 90. Nozzle 92 has a rounded front portion 96 that is compatible with the molder (not shown) into which plastic is injected. Further, nozzle 92 has a central bore 98 that communicates with melt outlet port 88. Bore 98 includes a downstream-most portion 100 with a somewhat reduced diameter and a reduction portion 102 that allows downstream portion 100 to communicate with the upstream portion of bore 98.

Nozzle adapter 90 includes a cartridge heater 104 and lead wires 106. Heater 104 maintains the plastic melt at appropriate temperatures for deep melt injection into larger molder sizes.

As indicated in phantom in FIG. 9, the cylindrical body of nozzle 92 can be lengthened so as to effect even deeper melt injection into larger molder sizes. In all other respects, the modified version depicted in FIG. 9 is identical to, and operates in a manner similar to that described hereinabove.

Although the present invention has been described relative to exemplary embodiments thereof, modifications and variations can be effected in these embodiments without departing form the scope and spirit of the invention.

I claim:

1. A plastic molding apparatus of the tye comprising a plastic melt injection apparatus and an injection mold wherein the improvement comprises a valve means for providing communication between said injection apparatus and said mold, said valve means having a single, transversely-undivided, straight line elongated passageway through which all the plastic melt flows, said passageway extending in the direction of flow of the plastic melt, from an inlet end to an outlet end, a closing means in the passageway, said closing means being elongated and extending longitudinally in the passageway and starting at a front downstream end which cooperates with the said outlet end to permit or cut off the flow of plastic melt therethrough and terminating at a rear upstream end which is located in the passageway, th cross-section of at least a portion of the passageway between the inlet end and the said rear upstream end of the closing means, taken transversely to the direction of flow of plastic melt, being essentially circular, and the cross-section of at least a portion of the passageway in the vicinity of the closing means being U-shaped, taken transversely to the direction of flow, and being transversely-undivided to provide for flow of the melt from the circular cross-section portion against and around the said rear upstream end of the closing means and into and through the U-shaped cross-section portion without serving of the body of plastic melt passing therethrough into more than one continuous body.

2. An apparatus in accordance with claim 1 wherein said U-shaped section of said passageway is defined by an inner, generally circular curve of from between about 180° to about 300° and an outer concentric, generally circular curve of from between about 180° to about 300°, a first concave curve gradually joining the first end of the inner curve to the adjacent first end of the outer curve, and a second concave curve gradually joining the second end of the inner curve to the adjacent second end of the outer curve.

3. A plastic molding apparatus of the type comprising a plastic melt injection apparatus and an injection mold, wherein the improvement comprises a valve means having a passageway providing communication between said injection apparatus and said mold, said valve means including an inlet end and an outlet end, a rod positioned in said passageway between said inlet end and said outlet end, the downstream end of the rod cooperating with the outlet end of the valve to permit or cut off flow of plastic melt therethrough, and a housing in which said rod is slidably mounted, said housing having a rear upstream end and a front downstream end, the rear upstream end being located in the passageway between the inlet end and the outlet end, said housing having a single leg, fixedly attached thereto and extending therefrom transverse, relative to the direction of flow of the plastic melt, supporting said housing in said passageway, the remainder of the space about the housing, other than the space taken up by the said leg, being open to provide a single, undivided flow path about the housing such that the plastic melt flows from a point upstream of the upstream end of the housing, past the housing itself to the said outlet end, without severing the body of plastic melt passing therethrough into more than one continuous body.

4. Apparatus in accordance with claim 3 wherein said rod is generally elongate and cylindrical and wherein said housing is generally elongate and cylindrical so as to extend coaxially about said piston, said housing having an aperture at one end through which said rod is slidingly projected.

5. Apparatus in accordance with claim 3 wherein said single leg includes a plow-shaped, upstream-facing surface.

6. Apparatus in accordance with claim 3 wherein said single leg includes a plow-shaped, downstream-facing surface.

7. Apparatus in accordance with claim 3 wherein said leg is streamlined so as to offer minimum resistance to the flow of plastic thereby.

8. Apparatus in accordance with claim 3 wherein said leg includes first and second convex surfaces that merge together at an upstream leading edge and a downstream trailing edge.

9. Apparatus in accordance with claim 3 further including a tubular sleeve positioned coaxially about said housing, said leg fixedly attached to said sleeve so as to rigidly mount said housing to said sleeve, the inner surface of said sleeve for forming a portion of the said passageway, for stabilizingly mounting said housing in said valve.

10. Apparatus in accordance with claim 3 wherein said leg has a passageway therethrough for accommodating a rod-engaging lever that effects rod sliding.

11. Apparatus in accordance with claim 3 wherein said housing has a generally conical upstream-facing surface.

12. An apparatus in accordance with claim 3 wherein said rod includes a plug-shaped tip and wherein said outlet end includes a nozzle having a melt outlet port, said plug-shaped tip received in said outlet port for expelling melt residue and for cleaning said outlet port after each plastic melt injection into said mold.

13. An apparatus in accordance with claim 3 wherein said valve means includes an elongate nozzle with said valve outlet end formed as an elongate bore therein for providing a long melt injection reach into said mold.

14. An apparatus in accordance with claim 13 wherein said valve means includes a heater means for heating the melt in said bore of said nozzle.

* * * * *

UNITED STATES PATENT AND TRADEMARK OFFICE
CERTIFICATE OF CORRECTION

PATENT NO. : 4,076,485
DATED : February 28, 1978
INVENTOR(S) : Nickolas N. Sokolow It is certified that error appears in the above-identified patent and that said Letters Patent are hereby corrected as shown below:

Column 6, line 63 first word, "serving" should read
---severing---.

Signed and Sealed this

Twentieth Day of June 1978

[SEAL]

Attest:

RUTH C. MASON
Attesting Officer

DONALD W. BANNER
Commissioner of Patents and Trademarks